United States Patent
Mock et al.

(12) 
(10) Patent No.: US 12,025,183 B2
(45) Date of Patent: Jul. 2, 2024

(54) WHEEL BEARING

(71) Applicant: Schaeffler Technologies AG & Co. KG, Herzogenaurach (DE)

(72) Inventors: Christian Mock, Schweinfurt (DE); Marco Krapf, Burkardroth (DE); Darius Dlugai, Schwebheim (DE); Andreas Kaiser, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 11 days.

(21) Appl. No.: 17/892,204

(22) Filed: Aug. 22, 2022

(65) Prior Publication Data

US 2024/0060536 A1  Feb. 22, 2024

(51) Int. Cl.
| | |
|---|---|
| *F16C 33/78* | (2006.01) |
| *B60B 27/00* | (2006.01) |
| *F16C 33/80* | (2006.01) |
| *F16C 41/00* | (2006.01) |

(52) U.S. Cl.
CPC ...... *F16C 33/7823* (2013.01); *B60B 27/0073* (2013.01); *F16C 33/783* (2013.01); *F16C 33/7879* (2013.01); *F16C 33/805* (2013.01); *F16C 41/007* (2013.01); *F16C 2326/02* (2013.01)

(58) Field of Classification Search
CPC .. F16C 33/7823; F16C 33/783; F16C 33/768; F16C 33/7869; F16C 33/7873; F16C 33/7879; F16C 33/7883; F16C 33/80; F16C 33/805; F16C 41/007; F16C 2326/02; B60B 27/0073
See application file for complete search history.

(56) References Cited

U.S. PATENT DOCUMENTS

| | | | |
|---|---|---|---|
| 6,637,754 B1* | 10/2003 | Ohtsuki | F16C 33/64 277/549 |
| 2016/0059627 A1* | 3/2016 | Komai | B60B 7/0013 384/446 |

FOREIGN PATENT DOCUMENTS

| | | | | |
|---|---|---|---|---|
| CN | 204572800 U | 8/2015 | | |
| CN | 206478120 U | 9/2017 | | |
| DE | 102011080741 A1 | 2/2013 | | |
| DE | 102011086550 A1 | 5/2013 | | |
| EP | 337321 A * | 10/1989 | ......... | F16C 33/7883 |
| EP | 1963697 B1 | 11/2014 | | |

(Continued)

OTHER PUBLICATIONS

Machine Translation of JP-61065913-A (Year: 1986).*
Machine Translation of EP-337321-A (Year: 1989).*

*Primary Examiner* — Alan B Waits
(74) *Attorney, Agent, or Firm* — Volpe Koenig

(57) ABSTRACT

A bearing assembly includes an inner bearing ring, an outer bearing ring and rolling bodies located between the inner bearing ring and the outer bearing ring. A gap is defined by a radially outer surface of the inner bearing ring and a radially inner surface of the outer bearing ring. The radially inner surface of the outer bearing ring includes a first radial surface portion that is offset a greater distance from a center of the bearing than a second radial surface portion. The first and second radial surface portions are connected by a sloped surface. A sealing arrangement located in the gap. The sealing arrangement includes a first annular body including an elastomeric sealing protrusion to contact the sloped surface of the outer bearing ring.

20 Claims, 4 Drawing Sheets

(56) References Cited

FOREIGN PATENT DOCUMENTS

| | | | |
|---|---|---|---|
| EP | 2557325 | B1 | 9/2015 |
| JP | 61065913 | A  * | 4/1986 |
| JP | 2009030760 | A | 2/2009 |
| JP | 2017003073 | A | 1/2017 |
| JP | 2020020398 | A | 2/2020 |
| KR | 101965601 | B1 | 4/2019 |

* cited by examiner

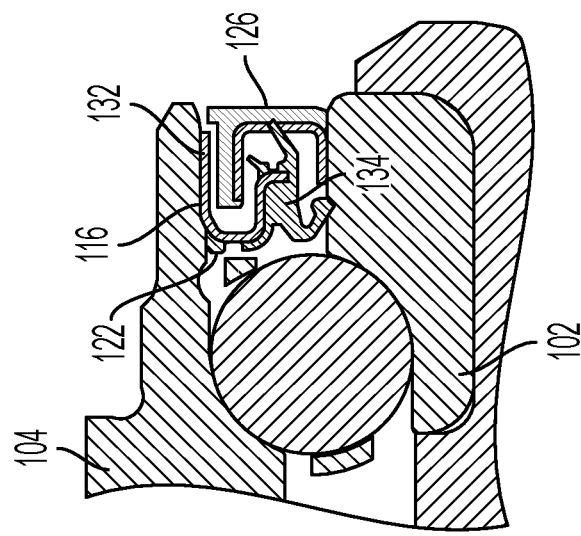
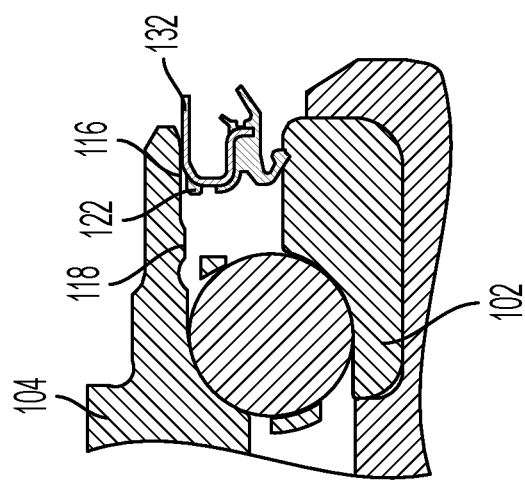
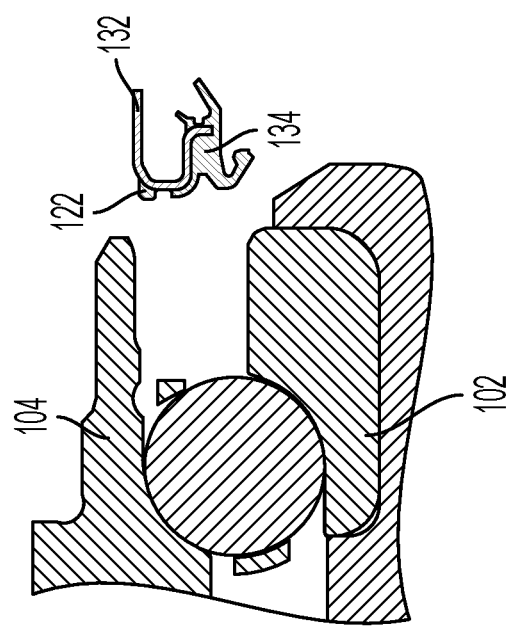
FIG. 2A
FIG. 2B
FIG. 2C

WHEEL BEARING

FIELD OF INVENTION

The present disclosure relates generally to bearings, and more particularly to bearings with a sealing arrangement.

BACKGROUND

In typical automotive wheels, it is important to protect the rolling elements of the bearings from dust and debris using annular seals. The seals are inserted between the inner and outer bearing rings. To achieve the desired seal performance, normally one or more dynamic lip seals that are located on a mounting body connected to one of the bearing rings are in contact with opposite rotating surface(s) of the other bearing ring at one or more positions. Typical seal designs also provide a sealed connection between the mounting body and the associated bearing ring using a static rubber seal that contacts a part of the bearing ring where the seal mounting body is pressed into position. However, this static seal has a high likelihood of shearing off during assembly of the seal. Additionally, a position of the seal mounting body when installed is also critical to having the correct (i.e. optimal) contact pressure of the lip seal(s).

Conventional seals and sealing components have generally been considered satisfactory for their intended purpose. However, there is still a need in the art for improved bearing seals that provide improved protection, and better installation technique. The present disclosure provides a solution for this need.

SUMMARY

A bearing assembly for a bearing is disclosed. The bearing assembly includes an inner bearing ring, an outer bearing ring, rolling bodies located between the inner bearing ring and the outer bearing ring. The bearing assembly also includes a gap defined by a radially outer surface of the inner bearing ring and a radially inner surface of the outer bearing ring, the radially inner surface of the outer bearing ring includes a first radial surface portion that is offset a greater distance from a center of the bearing assembly than a second radial surface portion, the first and second radial surface portions are connected by a sloped surface. A sealing arrangement located can be in the gap, which includes, a first annular body to contact the sloped surface of the outer bearing ring, and an axially extending first leg configured for a press fit with the first radial surface portion in an installation position.

In further aspects, the axially extending first leg can include a radially inwardly directed bend that transitions to a radially extending second leg, and an elastomeric sealing protrusion on the first annular body, adjacent to the sloped surface, can be located in an area of the radially inwardly directed bend. The first annular body can include an axially extending third leg, and a first elastomeric lip seal that can contacts the inner bearing ring. The bearing assembly can include a second annular body having an axially extending fourth leg press fit to the radially outer surface of the inner bearing ring, wherein the fourth axially extending leg can transitions into a radially extending fifth leg, and an axially extending sixth leg extending from a radially outer end of the fifth leg can define a generally U-shaped cross-section. The third leg can include a radially outwardly directed bend, the third leg can extend into the generally U-shaped cross-section to define a labyrinth seal. A second elastomeric lip seal can extend from the first annular body to the second annular body.

In further aspects, the bearing assembly can include an elastomeric sealing protrusion on the first annular body adjacent to the sloped surface, wherein the elastomeric sealing protrusion can include a maximal outer diameter greater than a diameter defined by the second radial surface portion of the outer bearing ring. The elastomeric sealing protrusion can include a maximal outer diameter smaller than an outer diameter of the first leg.

In further aspects, the first annular body can metallic. The first annular body can be non-magnetic. The second annular body can include an encoder. The encoder can be located on an axially exterior side of second annular body. The encoder can be magnetized on an axially exterior side thereof or on a radially inward side thereof. The first annular body and the encoder can define at least one gap therebetween.

A method of inserting a bearing sealing arrangement is also disclosed. The method includes inserting a first annular body including in a gap between an inner bearing ring and an outer bearing ring, contacting a radially outer surface of the inner bearing ring with a first elastomeric lip seal that extends from the first annular body, contacting a first radial surface portion of a radially inner surface of the outer bearing ring with a first leg of the first annular body. Then contacting a sloped surface, adjacent to the first radial surface portion of the radially inner surface of the outer bearing ring, with the first annular body and contacting the radially outer surface of the inner bearing ring with a second annular body of the sealing arrangement.

In further aspects, the first annular body can include an elastomeric sealing protrusion, which is inserted in the gap before the second annular body. The second radial surface portion can be located radially inward of the first surface portion. The first leg of the first annular body can be press fit against the sloped surface. The first leg can include a radially inwardly directed bend that transitions to a radially extending second leg, and the elastomeric sealing protrusion can be located in an area of the radially inwardly directed bend.

It is noted that one or more of the optional features noted above may be used alone or in various combinations with one another in connection with the basic bearing assembly and associated sealing arrangement.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 2A-2C are cross-sectional views of the bearing assembly of FIG. 1 showing a step-by-step insertion of the sealing arrangement into a gap between inner and outer bearing rings;

DETAILED DESCRIPTION

Figure 1:
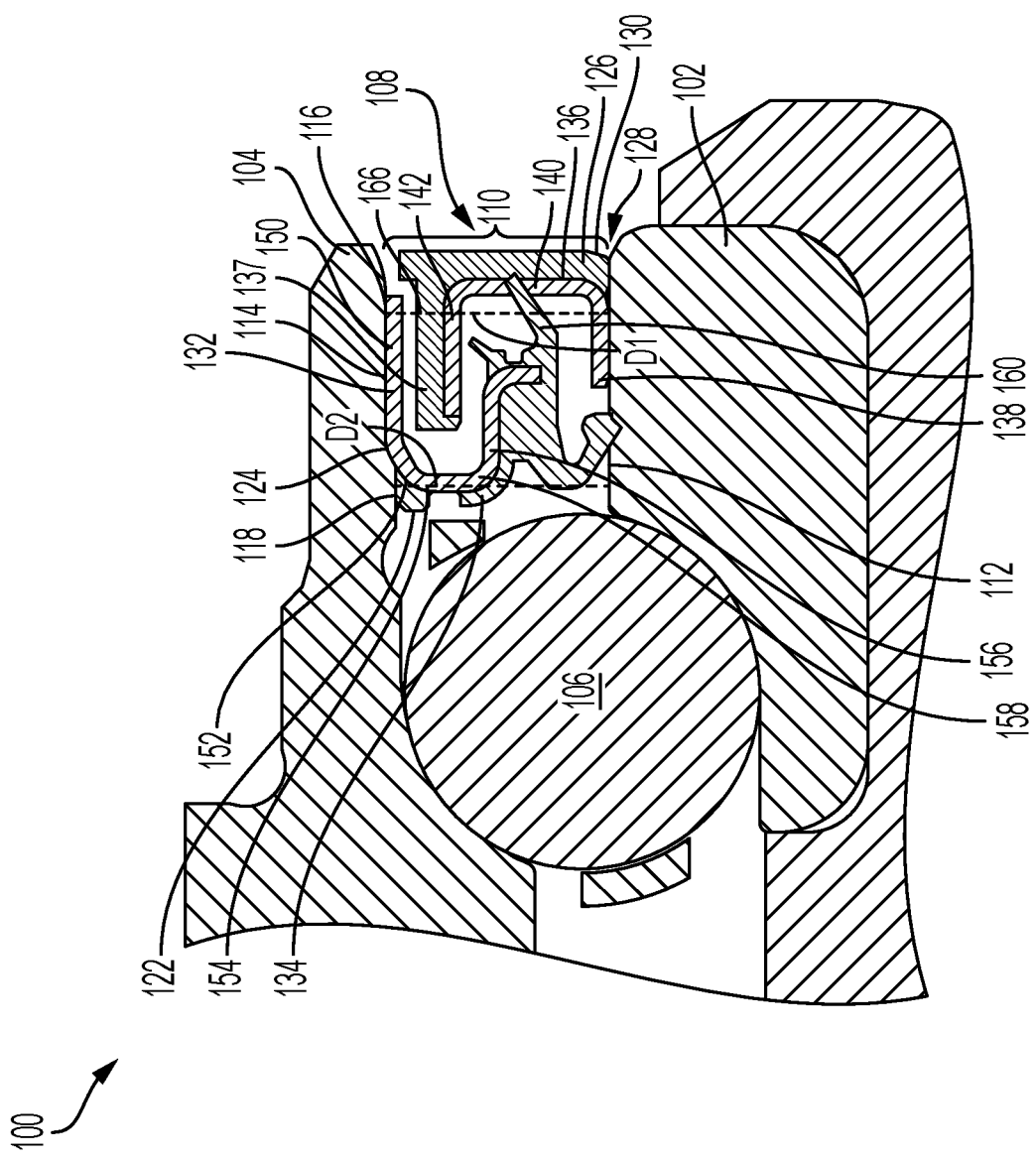
FIG. 1 is a cross-sectional view illustrating a bearing assembly according to one embodiment the disclosure.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Reference will now be made to the drawings wherein like reference numerals identify similar structural features or aspects of the subject disclosure. For purposes of explanation and illustration, and not limitation, a system view of an exemplary embodiment of the bearing assembly in accordance with the disclosure is shown in FIG. 1 and is designated generally by reference character 100. Other embodiments of the assembly in accordance with the disclosure, or aspects thereof, are provided in FIGS. 2A-4, as will be described. The assembly described herein can be used to improve the useful life of the sealing arrangement by improving installation results.

FIG. 1 shows a cross-section of a bearing assembly 100 of a vehicle wheel. The bearing assembly 100 includes an inner bearing ring 102 and an outer bearing ring 104 arranged with rolling bodies 106 therebetween. A gap 108 between the inner bearing ring 102 and the outer bearing ring 104 provides space for a sealing arrangement 110. The gap 108 is defined by a radially outer surface 112 of the inner bearing ring 102 and a radially inner surface 114 of the outer bearing ring 104. The radially inner surface 114 of the outer bearing ring 104 can include at least a first radial surface portion 116 and a second radial surface portion 118. The second radial surface portion 118 is radially inward of the first radial surface portion 116 and the two radial surface portions 116, 118 are connected by a sloped surface 124, however a curved surface or a step are also considered. The sloped surface 124 can be produced by grinding the outer bearing ring 104. Other fine detail production methods are also possible. The radially outer surface 112 of the inner bearing ring 102 extends at a constant radial distance from a center of the bearing, which is illustrated as a horizontal surface in the cross-section of FIG. 1.

Still with reference to FIG. 1, a sealing arrangement 110 is located within the gap 108. The sealing arrangement 110 includes at least a first annular body 132, a first elastomeric lip seal 134 molded onto and partially enveloping the first annular body 132, a second annular body 136, and an elastomeric sealing protrusion 122 also molded onto the first annular body 132. The first annular elastomeric lip seal 134 also contacts the inner bearing ring 102.

In one embodiment of the sealing arrangement 110, as shown in FIG. 1, the sealing arrangement 110 includes the first annular body 132 having an axially extending first leg 150, a radially inwardly directed bend 152 that transitions to a radially extending second leg 154, and the elastomeric sealing protrusion 122 being located in an area of the radially inwardly directed bend 152. The first annular body 132 also includes an axially extending third leg 156 and the first elastomeric lip seal 134 is connected to the third leg 156. A radially outwardly directed bend 158 can extend between the third leg 156 and the radially extending second leg 154 such that the first annular body 132 can be formed in one piece.

The second annular body 136 includes an axially extending fourth leg 138 press fit to the radially outer surface 112 of the inner bearing ring 102. The axially extending fourth leg 138 transitions into a radially extending fifth leg 140, and an axially extending sixth leg 142 extends from a radially outer end of the fifth leg 140 to define a generally U-shaped cross-section. The third leg 156 extends into the generally U-shaped cross-section to define a labyrinth seal and a second elastomeric lip seal 160 extends from the first annular body 132 to the second annular body 136.

The sealing arrangement 110 is also intended to retain and/or include an encoder 126 to deliver a magnetic signal for wheel speed sensor to measure the wheel speed. In one embodiment of the disclosure, the encoder 126 can be located on an axially exterior side 128 of the sealing arrangement 110, for example on the second annular body 136, and can be magnetized on an axially exterior side 130 thereof. In this case, the first annular body 132 can be made of magnetic stainless steel or mild steel, such as ferritic steel. The encoder 126 can also be oriented axially and be magnetized radially inward at a location 137 radially outward from the axially extending leg sixth 142. In this instance the first annular member 132 can be made of a non-magnetic stainless steel such as austenitic steel. At the same time, the outer bearing ring 104 must have at least on one circumferential position an opening that extends in axial direction so that a magnetic field provided by the radially magnetized encoder 126 can pass non-magnetic stainless steel of the first annular member 132 and be picked up by wheel speed sensor. The first annular body 132 and the encoder 126 define a gap 166 at a radially inner portion of the first annular body 132.

The elastomeric sealing protrusion 122 can contact the second radial surface portion 118 in the installed position and can optionally also contact the sloped surface 124 extending between the first and second radial surface portions 116, 118 of the outer bearing ring 104. The first annular body 132 is configured to be press fit against the first radial surface portion 116 of the outer bearing ring 104 and against sloped surface 124. A maximum diameter (D1) (shown via dashed lines) of the sealing arrangement 110, defined by the first leg 150 of the first annular body 132, is greater than a diameter (D2) (shown via dashed lines) defined by the second radial surface portion 118 of the outer bearing ring 104.

Referring to FIGS. 2A-2C, a method of inserting the bearing sealing arrangement 110 is shown. FIG. 2A shows the inner bearing ring 102, the outer bearing ring 104, and part of the sealing arrangement 110 with the first annular body 132 and the first elastomeric lip seal 134 outside of the bearing assembly. FIG. 2B shows a partially inserted sealing arrangement 110 with the first annular body 132 and the first elastomeric lip seal 134, and the elastomeric sealing protrusion 122 not contacting the first radial surface portion 116 of the outer bearing ring 104. FIG. 2C shows a fully inserted sealing arrangement 110, with the elastomeric sealing protrusion 122 pressed against the second radial surface portion 118, and the first annular body 132 press fit against the first radial surface portion 116 and against sloped surface 124 for an axial stop, along with the second annular body 136 and the encoder 126 closing in the sealing arrangement from an axially external side.

The systems of the present disclosure, as described above and shown in the drawings, provide for a sealing arrangement with superior properties, allowing for a longer useful life due to both repeatable and precision positioning as well as a decreased likelihood of shearing off a portion of the seal during assembly.

Figure 3:
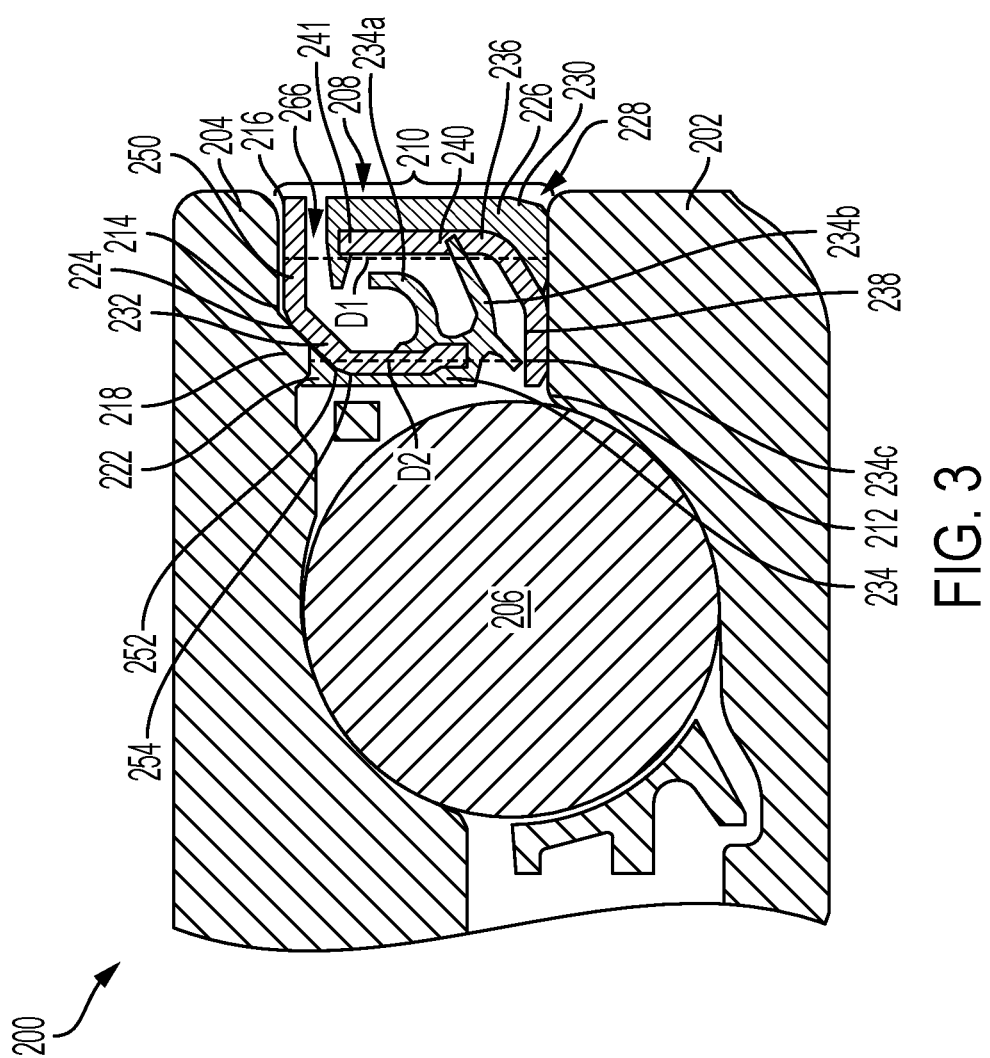
FIG. 3 is a cross-sectional view illustrating another embodiment of a bearing assembly according to the disclosure.

FIG. 3 shows a cross-section of an alternate bearing assembly 200. The bearing assembly 200 includes an inner bearing ring 202 and an outer bearing ring 204 arranged with rolling bodies 206 therebetween. A gap 208 between the inner bearing ring 202 and the outer bearing ring 204 provides space for a sealing arrangement 210. The gap 208 is defined by a radially outer surface 212 of the inner bearing ring 202 and a radially inner surface 214 of the outer bearing ring 204. The radially inner surface 214 of the outer bearing ring 204 can include at least a first radial surface portion 216 and a second radial surface portion 218. The second radial surface portion 218 is radially inward of the first radial surface portion 216 and the two radial surface portions 216, 218 are connected by a sloped surface 224, however a curved surface or a step are also considered. The sloped surface 224 can be produced by grinding the outer bearing ring 204. Other fine detail production methods are also possible. The radially outer surface 212 of the inner bearing ring 202 extends at a constant radial distance from a center of the bearing, which is illustrated as a horizontal surface in the cross-section of FIG. 3.

Still with reference to FIG. 3, a sealing arrangement 210 is located within the gap 208. The sealing arrangement includes at least a first annular body 232, a first elastomeric lip seal 234 molded onto and partially enveloping the first annular body 232, a second annular body 236, and an elastomeric sealing protrusion 222 also molded onto the first annular body 232. The first annular elastomeric lip seal 234 also contacts the axially extending leg fourth 238 of the second annular body 236.

In one embodiment of the sealing arrangement 210, as shown in FIG. 3, the sealing arrangement 210 includes the first annular body 232 having an axially extending first leg 250, a radially inwardly directed connecting leg 252 that transitions to a radially extending second leg 254, and the elastomeric sealing protrusion 222 is located in an area of the radially inwardly directed connecting leg 252. The first elastomeric lip seal 234 includes three lips 234a, 234b, and 234c, with the second lip 234b contacting the second annular body 236, and the third lip 234c contacting or being also being in close proximity to the second annular body 236.

The second annular body 236 includes an axially extending fourth leg 238 press fit to the radially outer surface 212 of the inner bearing ring 202. The axially extending fourth leg 238 transitions into a radially extending fifth leg 240, which contacts the second lip 234b of the first elastomeric lip seal 234. The third lip 234c contacts or is in close proximity to the axially extending fourth leg 238. The first lip 234a forms part of a labyrinth seal with a radial outer end 241 of the radially extending fifth leg 240.

The sealing arrangement 210 is also intended to retain and/or include an encoder 226 to deliver a magnetic signal for wheel speed sensor to measure the wheel speed. In one embodiment of the disclosure, the encoder 226 can be located on an axially exterior side 228 of the sealing arrangement 210, for example on the second annular body 236, and can be magnetized on an axially exterior side 230 thereof. In this case, the first annular body 232 can be made of magnetic stainless steel or mild steel, such as ferritic steel.

The first annular body 232 and the encoder 226 can define a gap 266 at a radially inner portion of the first annular body 232.

The elastomeric sealing protrusion 222 can contact the second radial surface portion 218 in the installed position and can optionally also contact the sloped surface 224 extending between the first and second radial surface portions 216, 218 of the outer bearing ring 204. The first annular body 232 is configured to be press fit against the first radial surface portion 216 of the outer bearing ring 204 and against sloped surface 224. The maximum diameter (D1) (shown via dashed lines) of the sealing arrangement 210, defined by the first leg 250 of the first annular body 232, is greater than the diameter (D2) (shown via dashed lines) defined by the second radial surface portion 218 of the outer bearing ring 204.

Figure 4:
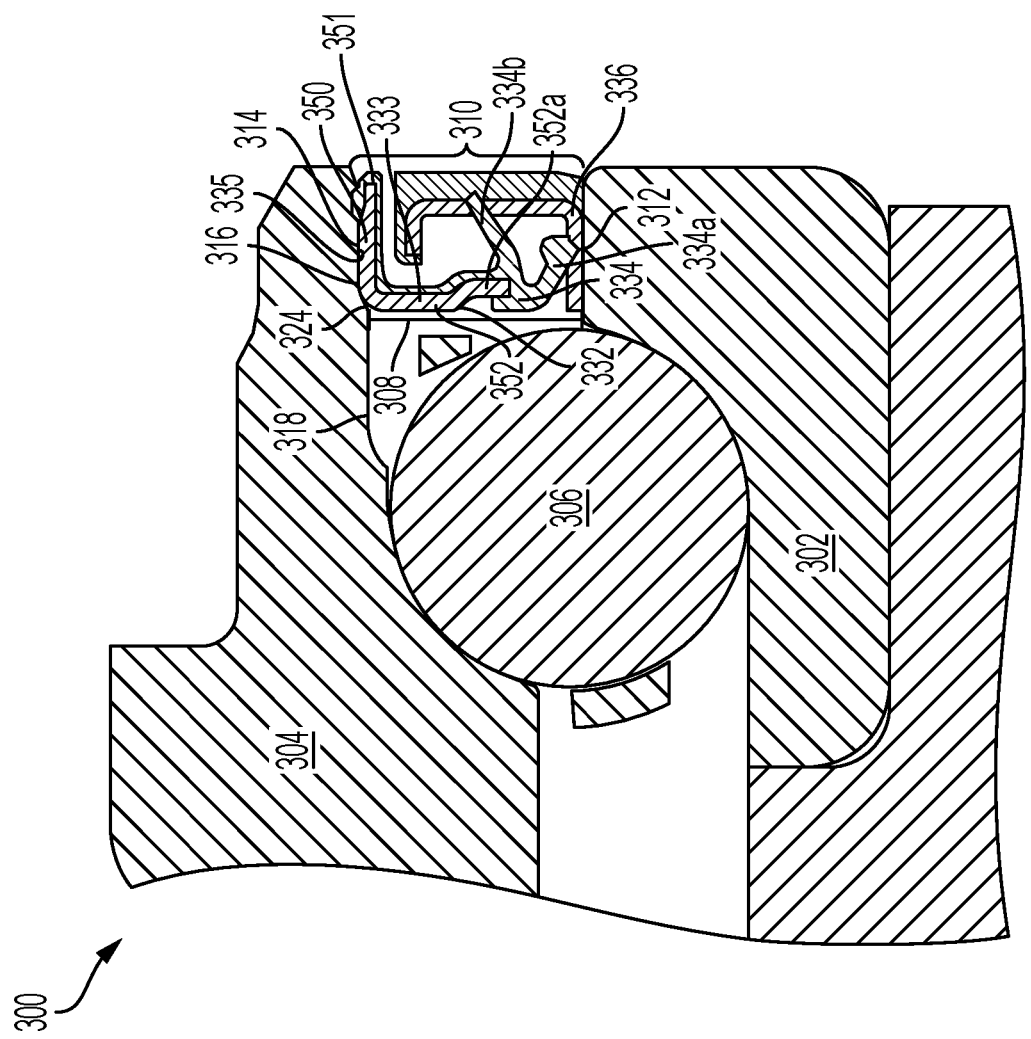
FIG. 4 is a cross-sectional view illustrating another embodiment of a bearing sealing assembly according to the disclosure.

FIG. 4 shows a cross-section of an alternate sealing arrangement 310 of bearing assembly 300. The bearing assembly 300 includes an inner bearing ring 302 and an outer bearing ring 304 arranged with rolling bodies 306 therebetween. A gap 308 between the inner bearing ring 302 and the outer bearing ring 304 provides space for a sealing arrangement 310. The gap 308 is defined by a radially outer surface 312 of the inner bearing ring 302 and a radially inner surface 314 of the outer bearing ring 304. The radially inner surface 314 of the outer bearing ring 304 can include at least a first radial surface portion 316 and a second radial surface portion 318. The second radial surface portion 318 is radially inward of the first radial surface portion 316 and the two radial surface portions 316, 318 are connected by a sloped surface 324, however a curved surface or a step are also considered. The sloped surface 324 can be produced by grinding the outer bearing ring 304. Other fine detail production methods are also possible. The radially outer surface 312 of the inner bearing ring 302 extends at a constant radial distance from a center of the bearing, which is illustrated as a surface parallel to the rotational axis in the cross-section of FIG. 4.

Still with reference to FIG. 4, the sealing arrangement 310 is located within the gap 308. The sealing arrangement 310 includes at least a first annular body 332, a first elastomeric lip seal 334 molded onto the first annular body 332, and a second annular body 336. The first annular body 332 includes an axially extending first leg 350, a radially inwardly directed connecting leg 352 that includes an axially outward offset section 352a. The first elastomeric lip seal 334 includes two lips 334a and 334b with the second lip 334b contacting the second annular body 336. The first elastomeric lip seal 334 is also molded and covers an outer surface 333 of the first annular body 332 and an axially distal end 351 of the first annular body 332, and wraps onto a portion of the radially outer surface 335 of the first annular body 332. In this configuration, the first elastomeric lip seal 334 provides a sealing interface with the outer bearing ring 304 instead of the sealing arrangement 310 including a separate molded sealing component, such as elastomeric sealing protrusion 122, 222.

Having thus described the exemplary embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the disclosed embodiment are possible which do not alter, with respect to those parts, the inventive concepts and principles embodied therein. The present embodiments and optional configura- tions are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LOG OF REFERENCE NUMERALS assembly 100, 200, 300
inner bearing ring 102, 202, 302
outer bearing ring 104, 204, 304
rolling bodies 106, 206, 306
gap 108, 208, 308
sealing arrangement 110, 210, 310
radially outer surface 112, 212, 312
radially inner surface 114, 214, 314
first radial surface portion 116, 216, 316
second radial surface portion 118, 218, 318
elastomeric sealing protrusion 122, 222
sloped surface 124, 224, 324
encoder 126, 226
axially exterior side 128, 228
axially exterior side 130, 230
first annular body 132, 232, 332
axially exterior surface of first annular body 333
first elastomeric lip seal 134, 234, 334
first lip 234a, 334a
second lip 234b, 234b
third lip 234c
radially exterior surface of first annular body 335
second annular body 136, 236, 336
fourth leg 138, 238
fifth leg 140, 240
sixth leg 142
radial outer end of the fifth radially extending leg 241
first leg 150, 250, 350
distal end of the first leg 351
radially inward bend 152
radially inward connecting leg 252, 352
axially outward offset section of radial leg 352a
second leg 154, 254
third leg 156
radially outward bend 158
second elastomeric lip seal 160
gap 166, 266

What is claimed is:
1. A bearing assembly comprising:
an inner bearing ring;
an outer bearing ring;
rolling bodies located between the inner bearing ring and the outer bearing ring;
a gap defined by a radially outer surface of the inner bearing ring and a radially inner surface of the outer bearing ring, the radially inner surface of the outer bearing ring having a first radial surface portion that is offset a greater distance from a center of the bearing assembly than a second radial surface portion, the first and second radial surface portions being connected by a sloped surface; and
a sealing arrangement located in the gap, the sealing arrangement including:
a first annular body configured to contact the sloped surface of the outer bearing ring, including an axially extending first leg being configured for a press fit with the first radial surface portion in an installation position;
wherein the first annular body further comprises an axially extending third leg, and a first elastomeric lip seal that contacts the inner bearing ring.

2. The bearing assembly of claim 1, wherein the axially extending first leg includes a radially inwardly directed bend that transitions to a radially extending second leg, and, an elastomeric sealing protrusion on the first annular body adjacent to the sloped surface at the radially inwardly directed bend.

3. The bearing assembly of claim 1, further comprising a second annular body having an axially extending fourth leg press fit to the radially outer surface of the inner bearing ring, wherein the fourth axially extending leg transitions into a radially extending fifth leg, and an axially extending sixth leg extending from a radially outer end of the radially extending fifth leg to define a U-shaped cross-section.

4. The bearing assembly of claim 3, wherein the axially extending third leg includes a radially outwardly directed bend.

5. The bearing assembly of claim 3, wherein the axially extending third leg extends into the U-shaped cross-section to define a labyrinth seal.

6. The bearing assembly of claim 3, wherein a second elastomeric lip seal extends from the first annular body to the second annular body.

7. The bearing assembly of claim 1, further comprising an elastomeric sealing protrusion on the first annular body adjacent to the sloped surface, wherein the elastomeric sealing protrusion includes a maximal outer diameter greater than a diameter defined by the second radial surface portion of the outer bearing ring.

8. The bearing assembly of claim 7, wherein the elastomeric sealing protrusion includes a maximal outer diameter smaller than an outer diameter of the first leg.

9. The bearing assembly of claim 1, wherein the first annular body is metallic.

10. The bearing of claim 1, wherein the first annular body is non-magnetic.

11. The bearing assembly of claim 1, wherein the second annular body includes an encoder.

12. The bearing assembly of claim 11, wherein the encoder is located on an axially exterior side of second annular body.

13. The bearing assembly of claim 12, wherein the encoder is magnetized on an axially exterior side thereof or on a radially inward side thereof.

14. The bearing assembly of claim 12, wherein the first annular body and the encoder define at least one gap therebetween.

15. A method of inserting a bearing sealing arrangement comprising: inserting a first annular body including a gap between an inner bearing ring and an outer bearing ring;
contacting a radially outer surface of the inner bearing ring with a first elastomeric lip seal that extends from the first annular body;
contacting a first radial surface portion of a radially inner surface of the outer bearing ring with a first leg of the first annular body;
contacting a sloped surface, adjacent to the first radial surface portion of the radially inner surface of the outer bearing ring, with the first annular body; and
contacting the radially outer surface of the inner bearing ring with a second annular body of the sealing arrangement; and contacting the inner bearing ring with an axially extending third leg of the first annular body.

16. The method of claim 15, wherein the first annular body includes an elastomeric sealing protrusion, which is inserted in the gap before the second annular body.

17. The method of claim 16, wherein the first leg includes a radially inwardly directed bend that transitions to a radially extending second leg, and the elastomeric sealing protrusion is located in an area of the radially inwardly directed bend.

18. The method of claim 15, wherein the second radial surface portion is located radially inward of the first surface portion.

19. The method of claim 15, wherein the first leg of the first annular body is press fit against the sloped surface.

20. A bearing assembly comprising:
   an inner bearing ring;
   an outer bearing ring;
   rolling bodies located between the inner bearing ring and the outer bearing ring;
   a gap defined by a radially outer surface of the inner bearing ring and a radially inner surface of the outer bearing ring, the radially inner surface of the outer bearing ring having a first radial surface portion that is offset a greater distance from a center of the bearing assembly than a second radial surface portion, the first and second radial surface portions being connected by a sloped surface; and
   a sealing arrangement located in the gap, the sealing arrangement including:
      a first annular body configured to contact the sloped surface of the outer bearing ring, including an axially extending first leg being configured for a press fit with the first radial surface portion in an installation position;
      an elastomeric sealing protrusion on the first annular body adjacent to the sloped surface, wherein the elastomeric sealing protrusion includes a maximal outer diameter greater than a diameter defined by the second radial surface portion of the outer bearing ring, and wherein the elastomeric sealing protrusion includes a maximal outer diameter smaller than an outer diameter of the first leg.

* * * * *